No. 887,781. PATENTED MAY 19, 1908.
A. P. FISCHER.
TRANSMISSION DEVICE.
APPLICATION FILED OCT. 24, 1907.
3 SHEETS—SHEET 1.
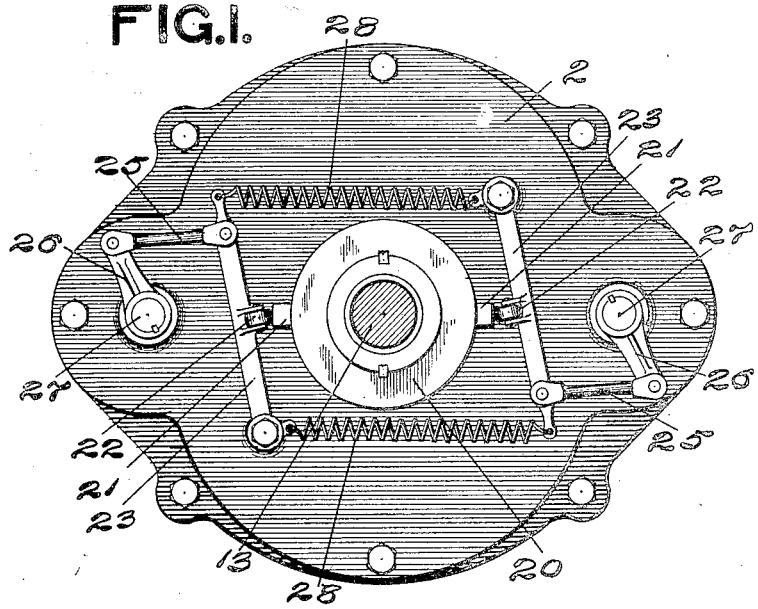
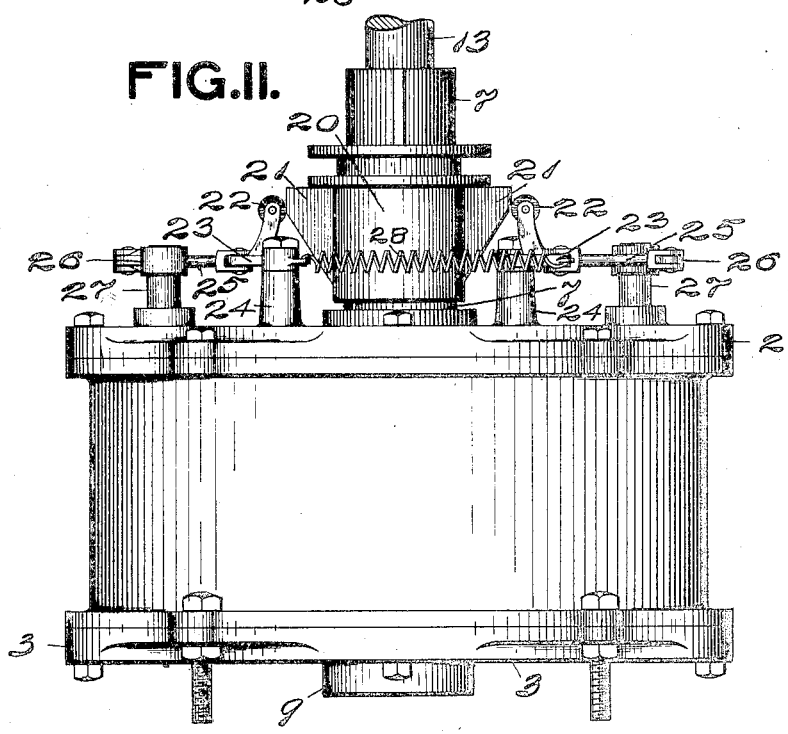

No. 887,781. PATENTED MAY 19, 1908.
A. P. FISCHER.
TRANSMISSION DEVICE.
APPLICATION FILED OCT. 24, 1907.
3 SHEETS—SHEET 2.
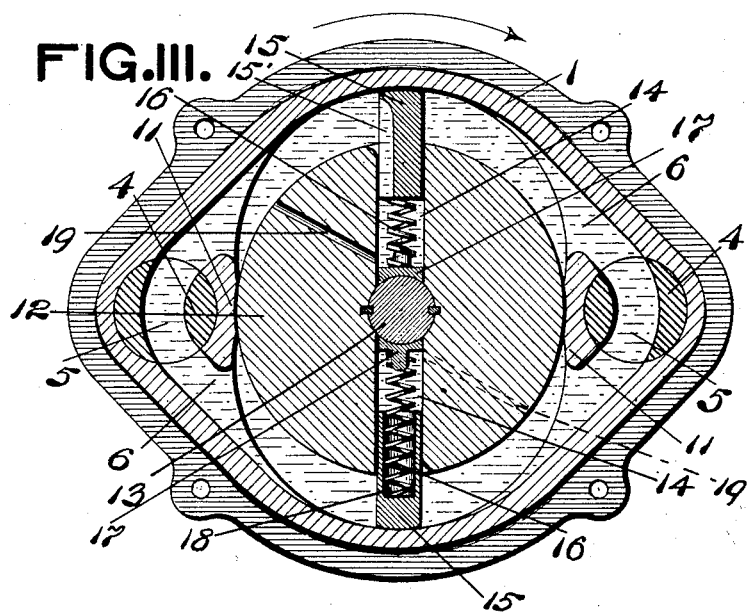
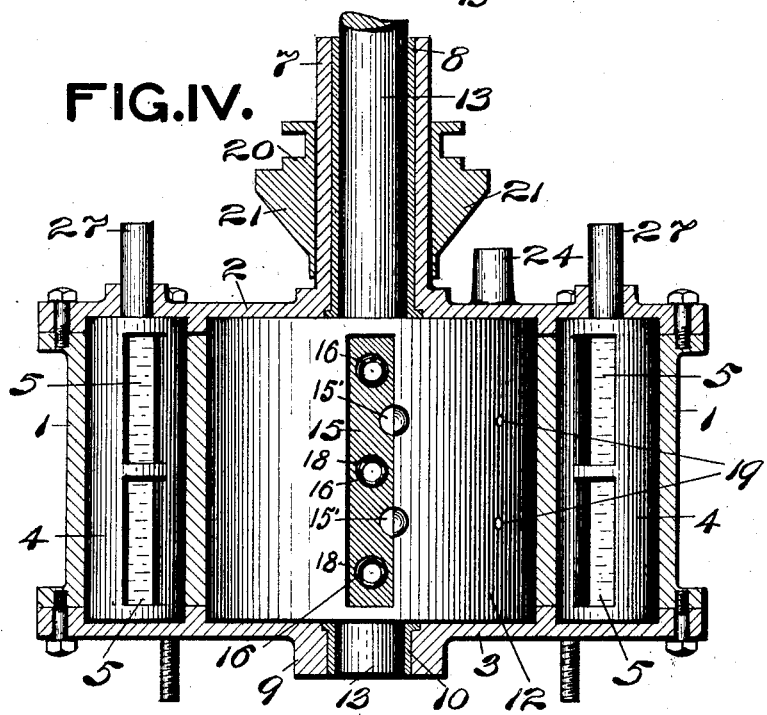
Witnesses
Richard N. Moller
U. H. Harrison
Inventor
Anson P. Fischer.
By Richard S. Harrison.
His Attorney No. 887,781.
PATENTED MAY 19, 1908.
A. P. FISCHER.
TRANSMISSION DEVICE.
APPLICATION FILED OCT. 24, 1907.
3 SHEETS—SHEET 3.
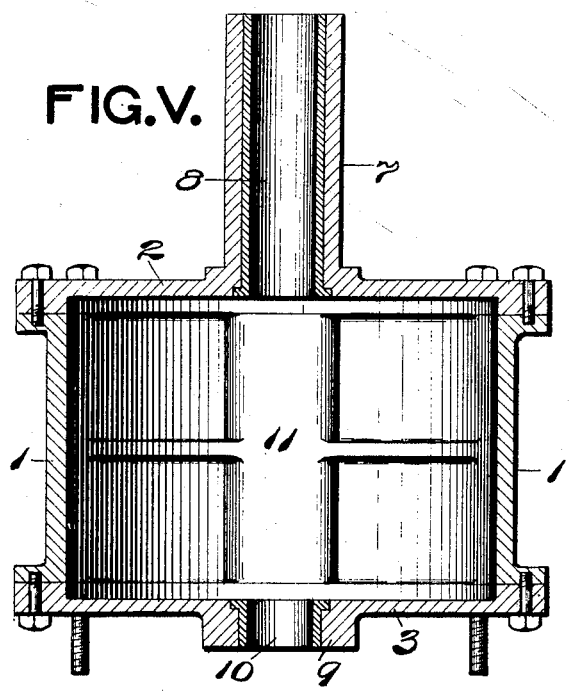
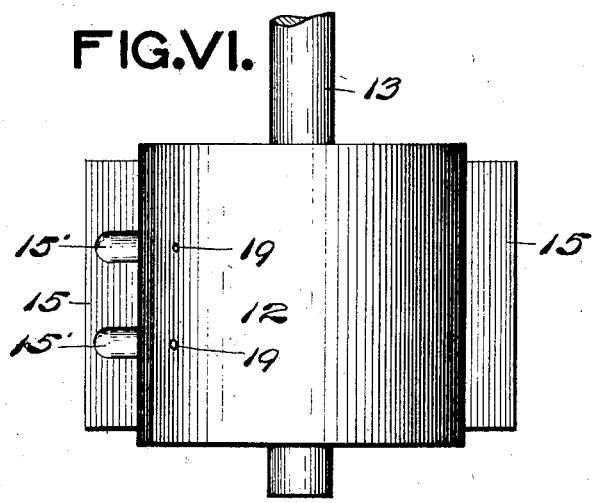

UNITED STATES PATENT OFFICE.

ANSON P. FISCHER, OF PITTSBURG, PENNSYLVANIA.

TRANSMISSION DEVICE.

No. 887,781.　　　　Specification of Letters Patent.　　　Patented May 19, 1908.

Application filed October 24, 1907. Serial No. 398,878.

*To all whom it may concern:*

Be it known that I, ANSON P. FISCHER, a citizen of the United States, residing at Pittsburg, in the county of Allegheny and State of Pennsylvania, have invented certain new and useful Improvements in Transmission Devices, of which the following is a specification.

My invention relates to improvements in power transmission and has for its object the provision of new and novel means whereby power imparted, from any available source, to a rotative member may be transmitted therefrom to another rotative member in such manner that the driven may be gradually accelerated to and maintained with that of the drive, any speed under that of the drive, or remain motionless independent of the drive, as circumstances may require, furthermore, the operation of stopping, starting, or changing of speed, is attained with a smoothness and absence of noise not heretofore attained by the employment of either simple or complex gearing, etc., thus making the same particularly desirable as a power transmission for automobiles, as well as for other numerous devices, said invention being an improvement over my former application, Serial No. 392,947, filed September 14, 1907.
To these ends the invention consists of a liquid medium, preferably oil, coacting with suitably assembled mechanical members, as will be hereinafter more particularly described and then set forth in the appended claims.

In the accompanying drawings, I have illustrated a structure capable of carrying out my invention, wherein Figure I, is a plan view of the device complete. Fig. II, is a side elevation of the same. Fig. III, is a plan view in transverse section, disclosing the interior workings. Fig. IV, is a partly sectional side elevation of some of the assembled parts. Fig. V, is a sectional side elevation of the outer movable member, and Fig. VI, is a side elevation of the inner movable member, similar detail parts of said views, where they occur, being designated by like numerals of reference.
The structure disclosed in the drawings, comprises a cylinder 1, provided with detachable heads 2 and 3, the interior of which is of elliptic form in cross-section and is provided with oppositely disposed valve chambers within which are fitted oscillatable valves 4 having ports 5 therein, said cylinder being further provided with by-passes 6 extending between the interior proper and the valve chambers, which by-passes register with the ports in said valves. The inner surface of the cylinder heads are shouldered to register with the valve chambers and elliptic portion of the cylinder so as to give increased bearing surface to the members operating therein, the head 2 being provided with an external elongated bearing 7 having a bushing 8 therein, and the head 3 with a boss or short bearing 9 having a bushing 10 therein.

Arranged within and engaging the shouldered portion of the heads, and the wall portions 11, is a rotatable member or piston 12 of annular form, mounted upon a shaft 13 extending through the said bearings 7 and 9 and provided with oppositely disposed slots 14, within which slots are slidably fitted the blades 15 having grooves 15' in one side, which blades are maintained in normal operative engagement with the cylinder walls by means of pressure exerted outwardly thereupon by the helical springs 16 arranged in said slots and extending from gibs 17 into cavities 18 formed in the blades. The piston is further provided with relief ports 19 extending from the periphery thereof at an inclination to and communicating with the aforesaid slots into which the blades are fitted. All unoccupied space in said cylinder, the by-passes, valve ports, etc., are filled with a suitable coöperative medium, preferably oil.
Arranged and adapted to slide longitudinally upon the exterior of the aforesaid bearing 7 is a valve operating sleeve 20 having, oppositely disposed inclined wings or slides 21 upon which engage the small wheels 22 carried by the parallel disposed levers 23, said levers being each pivotally connected at one extremity to a boss 24 integral with the cylinder head, and at their opposite ends to rods 25 which are connected to cranks 26 rigidly attached to the stems of the valves, said wheels being held in operative engagement with the sleeve slides by means of tension of the helical springs 28 connected to and between the extremities of the levers carrying the wheels.
Any suitable means may be employed to adjust the said sleeve 20 for actuating the valve mechanism, said means being, to some extent, dependable upon conditions and the nature of the device to which it is to be applied.

In practice, if it be assumed that the cylinder be, by any suitable means, attached to a rotative member to form the drive, and the piston shaft be connected to the member to be driven, then if the sleeve 20 be adjusted to cause the valves to present full registration of their ports to the by-passes, as shown at Fig. III, rotation (in the direction of the arrow) of the cylinder and attending parts will not effect a rotation of the piston and attending parts, owing to the liquid being merely displaced or caused to circulate from one side of the cylinder to the other, by way of the by-passes and valve ports, the blades 15 of the piston moving in and out in response to the elliptical surface engaged thereby as the cylinder rotates, contact of the blades with the cylinder walls being maintained at all times by the action of the aforesaid springs 16 assisted by the pressure of the liquid which has entered the slots 14 by way of the grooves 15', but, if the valves be adjusted so as to reduce the area of their ports to the by-passes, such reduction of area will necessarily occasion a resistance to or a less active circulation of the liquid therethrough, with the result that the decreased activity of the liquid will occasion a back pressure upon the piston blades in the direction of the rotation of the drive or cylinder, thereby effecting a rotation of the piston and attending connections in the same direction as the drive, the speed attained being proportionate to that of the activity of the liquid displacement. As the valves are further adjusted to reduce the port area it will be evident that the liquid will offer a greater resistance to displacement or become still less active, with a consequent increased speed of the piston and attending connections, and if the valves be adjusted so as to completely cut off the passage of the liquid therethrough such consequent inactivity or nondisplacement of the liquid will cause the piston and attending parts to rotate at the same speed as the drive, forming a unit, thus giving the same results as a clutch coupling. Opening the valves to any degree less than full exposure of the ports will give a corresponding decrease in the speed of the piston and attending connections, as will be apparent from the foregoing explanation, while full opening of the valves will cause cessation of the piston and attending parts.

During the rotation of the cylinder about the piston it will be apparent that as the resistance or back pressure of the liquid is increased upon the piston to effect a rotation thereof, that the pressure of the liquid in the slots 14 acting outwardly upon the blades 15 will be correspondingly increased to overcome any pressure of the liquid which might be acting in opposition thereto between the outer extremities of the blades and cylinder walls during rotation, the liquid in said slots being free to circulate back and forth, by way of the aforesaid grooves 15' in the blades, and as said blades pass over the wall portions 11 the back pressure is relieved by the ports 19.

It is obvious that the connections of the device with the drive and driven may be reversed with the same results in action, but in most cases it will be found preferable to connect the cylinder with the drive.

The coacting effect of the liquid resisting or retarding medium, with the mechanical structure disclosed, is such as may well be employed to perform the functions heretofore attained by the use of gears, clutches, etc., and in addition thereto lost motion, sudden jerking, and other disadvantages attending the use of such mechanisms are entirely eliminated.

Having thus shown and described an operative device to carry out my invention, what I claim as new and desire to secure by Letters Patent is:

1. A transmission device of the class described, comprehending a rotative cylinder of elliptic form in cross-section, provided with oppositely disposed by-passes communicating with the interior thereof and having an exterior annular extension about its axis of rotation, oscillatable valves in said by-passes, a sleeve carried by said extension and adapted to slide longitudinally thereon, means associated with said valves and sleeve whereby a sliding movement imparted manually to said sleeve will oscillate the valves, a rotative piston in said cylinder provided with oppositely disposed radial slots, spring actuated blades in said piston slots adapted to engage the walls of the cylinder, and a liquid filling the unoccupied space in said cylinder and by-passes.

2. A transmission device of the class described, comprehending a rotative cylinder of elliptic form in cross-section, provided with oppositely disposed by-passes communicating with the interior thereof and having an exterior annular extension about its axis of rotation, oscillatable valves in said by-passes, a sleeve carried by said extension and adapted to slide longitudinally thereon, means associated with said valves and sleeve whereby a sliding movement imparted manually to said sleeve will oscillate the valves, a rotative piston in said cylinder and provided with oppositely disposed slots, said piston having peripheral engagement with the cylinder walls at diametrically opposite points between the by-passes, spring actuated blades in said piston slots adapted to engage the walls of the cylinder, and a liquid filling the unoccupied space in said cylinder and by-passes.

3. A transmission device of the class described, comprehending a rotative cylinder of elliptic form in cross-section, provided with oppositely disposed by-passes communicating with the interior thereof and having an external annular extension about its axis of rotation, oscillatable valves in said by-passes, a sleeve carried by said extension and adapted to slide longitudinally thereon, means associated with said valves and sleeve whereby a sliding movement imparted manually to the sleeve will oscillate the valves, a rotative piston arranged in said cylinder and provided with oppositely disposed radial slots, spring actuated blades in said piston slots adapted to engage the walls of the cylinder, and a liquid filling the unoccupied space in said cylinder and by-passes, said blades being provided with channels upon their sides and said piston with relief ports.

4. A transmission device of the class described, comprehending a rotative cylinder of elliptic form in cross-section, provided with oppositely disposed by-passes communicating with the interior thereof and having an external annular extension about its axis of rotation, oscillatable valves in said by-passes, a sleeve carried by said extension and adapted to slide longitudinally thereon, means associated with said valves and sleeve whereby a sliding movement imparted manually to the sleeve will oscillate the valves, a rotative piston arranged in said cylinder and provided with oppositely disposed radial slots, spring actuated blades in said piston slots adapted to engage the walls of the cylinder, and a liquid filling the unoccupied space in said cylinder and by-passes, said blades being provided with channels upon their sides and said piston engaging peripherally with the walls of the cylinder at diametrically opposite points between the by-passes and is provided with relief ports communicating with the blade slots.

In testimony whereof I affix my signature in presence of two witnesses.

ANSON P. FISCHER.

Witnesses:
  R. S. HARRISON,
  R. M. KUHN.